No. 617,903. Patented Jan. 17, 1899.
C. S. MORRIS.
COMPUTING SCALE.
(Application filed Apr. 23, 1898.)
(No Model.) 3 Sheets—Sheet 1.
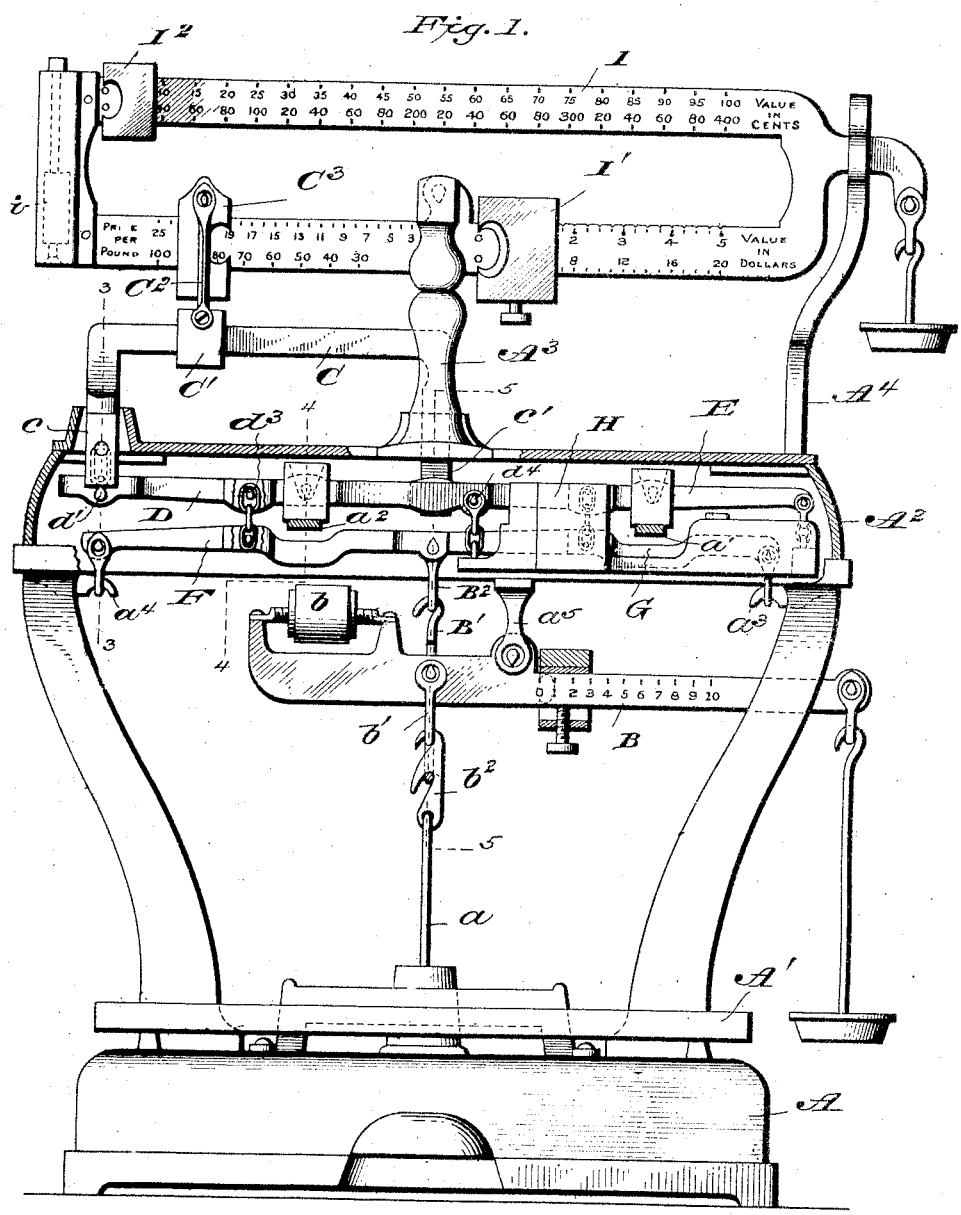

No. 617,903. Patented Jan. 17, 1899.
C. S. MORRIS.
COMPUTING SCALE.
(Application filed Apr. 23, 1898.)
(No Model.) 3 Sheets—Sheet 2.
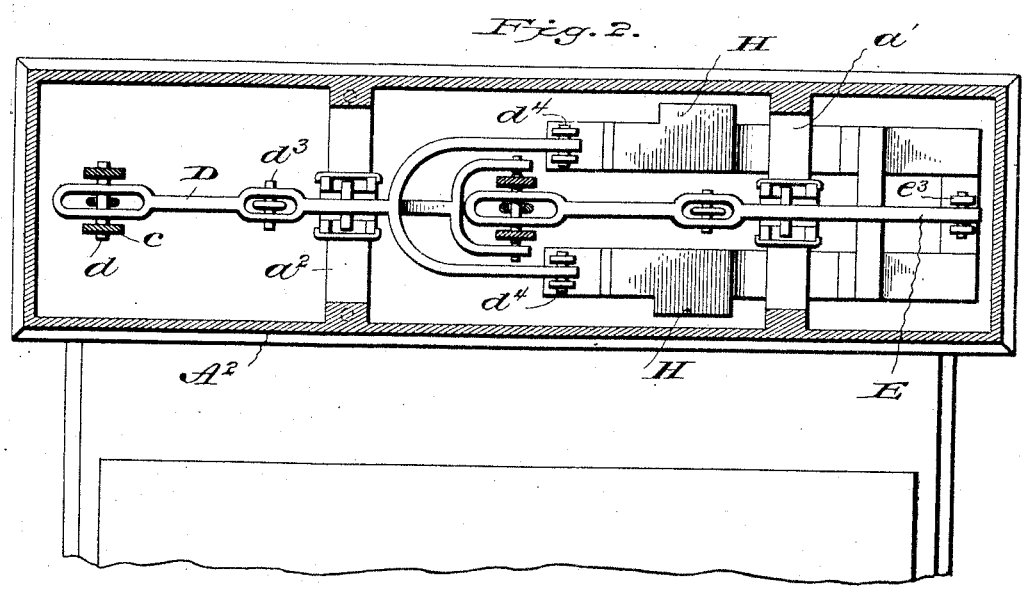
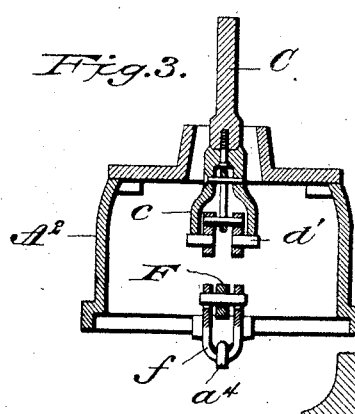
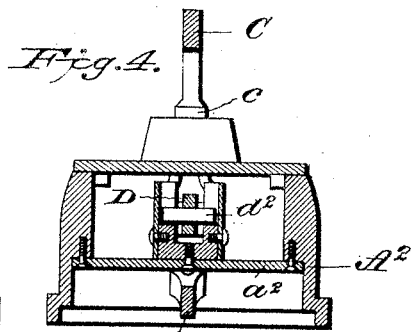
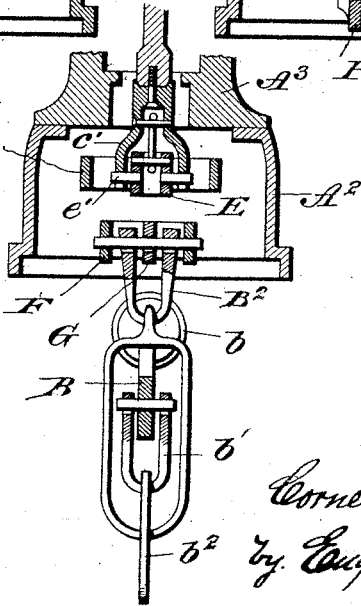
Witnesses
G. S. Elliott.
Percy B. Hills.
Inventor
Cornelius S. Morris
By Eugene W. Johnson
Attorney No. 617,903. Patented Jan. 17, 1899.
C. S. MORRIS.
COMPUTING SCALE.
(Application filed Apr. 28, 1898.)
(No Model.) 3 Sheets—Sheet 3.
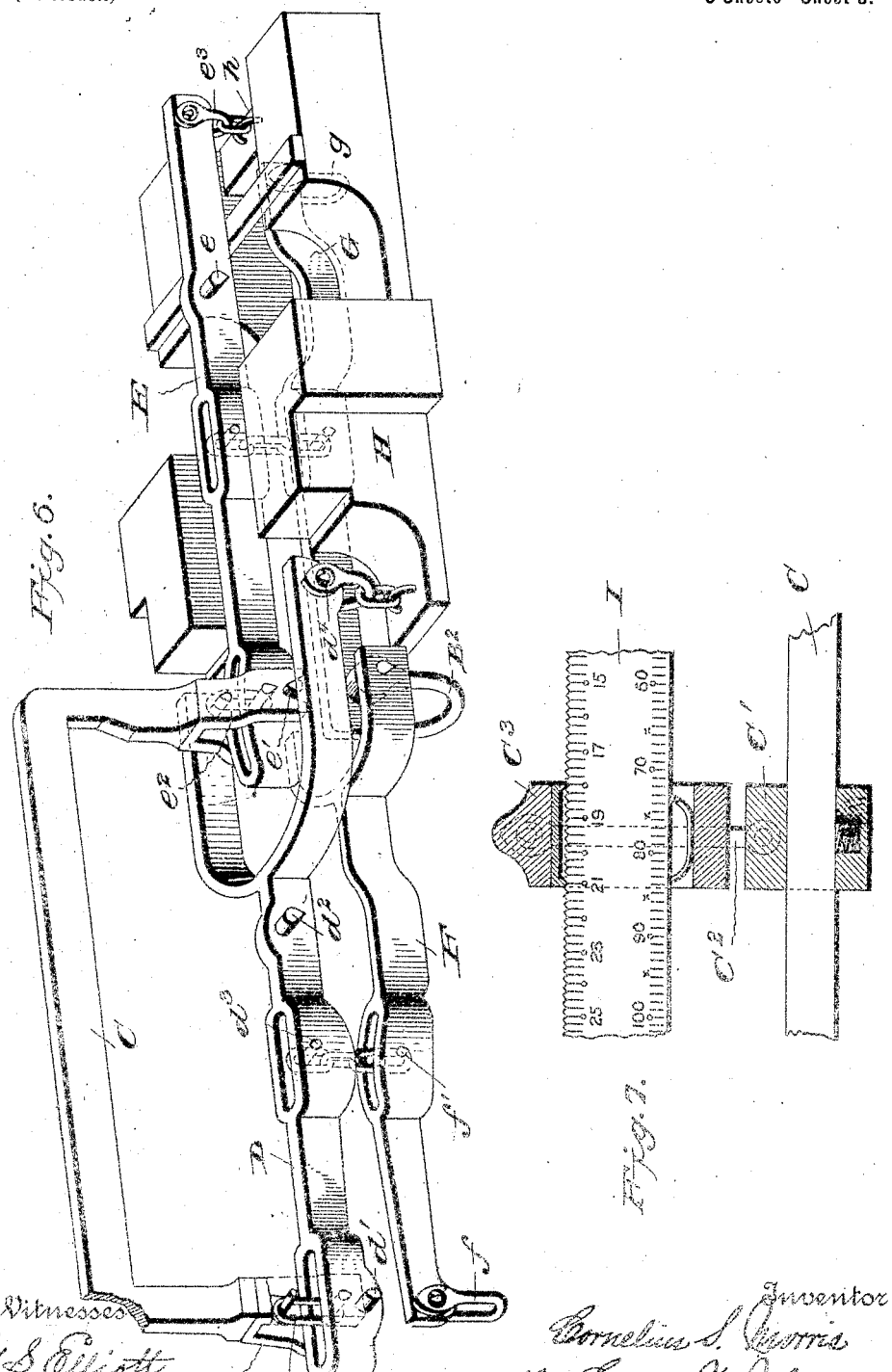

UNITED STATES PATENT OFFICE.

CORNELIUS S. MORRIS, OF MOLINE, ILLINOIS.

COMPUTING-SCALE.

SPECIFICATION forming part of Letters Patent No. 617,908, dated January 17, 1899.

Application filed April 23, 1898. Serial No. 678,648. (No model.)

*To all whom it may concern:*

Be it known that I, CORNELIUS S. MORRIS, a citizen of the United States, residing at Moline, in the county of Rock Island and State of Illinois, have invented new and useful Improvements in Computing-Scales, of which the following is a specification.

This invention relates to improvements in computing-scales or computing attachments for ordinary weighing-scales.

The object of said invention is to provide mechanism which is readily applicable to a scale having a load-receiving platform and scale-beam, which scale-beam is utilized as the connecting means between the load-receiving platform and computing mechanism, as well as for the purpose of deducting tare when necessary.

A further object of the invention is to provide a computing-scale of improved construction in which the load-receiving platform is supported upon levers of the ordinary type, the levers being connected to the weighing-beam, these parts being in engagement with equalizing-levers which carry or engage a bar, the movement thereof being vertical or in horizontal planes, said bar being connected to the computing-beam to one side of the fulcrum, the elements being so organized that by proper adjustment of the weights the scale may be used for weighing in the usual manner without the computing mechanism, also to utilize the scale-beam for tare, and when so used not to disorganize the operation of the computing-beam, which computing-beam is used to weigh and to ascertain the value of a certain amount of merchandise or the quantity which may be purchased for a given value.

A further object of this improvement is to provide a computing-scale in which the computing-bar is fulcrumed upon a fixed support, the bar being connected to a vertically-movable bar attached to or in engagement with equalizing-levers, the scale-beam, and with the load-receiving-platform-supporting levers, so that the several beams are in poise or balance irrespective of the position of the blocks and connecting means therefor between the vertically-movable bar and the computing-beam, or, in other words, the position of the connecting means between the computing-beam and the load-receiving platform is movable to and from the fulcrum of the computing-beam without in any wise affecting the poise of the computing-beam, the adjustment of the block being to arbitrarily fix a price per pound, while a movable weight carried by the computing-beam determines the value of the weight placed on the load-receiving platform, the means for connecting the computing-beam with the weighing and equalizing levers being brought in positive action only when a weight is placed upon the load-receiving platform.

A further object of the invention is to provide a computing-scale in which the several levers are fulcrumed upon fixed points, a pair of one set of levers carrying a bar with a horizontal portion and vertical end members, which bar is moved vertically and connected by movable blocks with a computing-beam, so that the shifting of the connecting means will not change or disarrange the poise or balance of the computing-beam until other elements or parts of the scale are brought into effective operation.

The invention has in view to provide a more durable computing-scale and one which is simpler in operation than those of the same type.

With the above ends in view my invention consists in the construction and combination of the parts and in their arrangement or organization, as will be hereinafter set forth.

Referring to the annexed drawings, Figure 1 is a front elevation, partly in section. Fig. 2 is a plan view, partly in section, showing the arrangement of levers in the upper portion of the casing or frame. Fig. 3 is a sectional view taken on the line 3 3 of Fig. 1. Fig. 4 is a sectional view on the line 4 4 of Fig. 1. Fig. 5 is a sectional view on the line 5 5 of Fig. 1. Fig. 6 is a perspective view of the equalizing-levers detached; and Fig. 7 is a detail view, partly in section, of a portion of the computing-scale beam, the bar connecting with the equalizing-levers, the means for connecting the beam and bar being shown in section.

A refers to the base of the scale, in which is located the ordinary levers carrying a frame, upon which is placed the platform A'. The long arm of one of the levers is connected to a rod $a$, said rod engaging with the tare-beam B. From the rear part of the base extend two uprights, which support a casing A², said casing having cross-bars a' a², to which are attached fulcrum-blocks. The casing adjacent to the supports has projecting hooks a³ a⁴, with which levers engage, and the casing A² has an upward-projecting standard A³, upon which is fulcrumed the computing-beam, an upright A⁴ being positioned on one end of the casing, said upright having an aperture, through which the end of the computing-scale beam is passed. The top or covering plate of the casing A² has openings therethrough, through which pass the vertical members of a bar, said bar being connected to the computing-scale beam above.

The tare-beam B is fulcrumed upon depending bars or a hanger a⁵, and this beam has the usual graduations as to pounds and fractions thereof, it being provided at one end with a loop and rod to receive weights. Upon the beam is mounted a sliding or adjustable weight, and on the opposite side of the fulcrum the beam B is connected to the rod a and beyond the point of connection has an adjusting-weight b. Instead of connecting the rod a to the loop b' there is interposed a double hook b², having at its lower end an eye with which the hook on the upper end of the rod a engages, and the upper hook of the part b² engages the loop b'.

B' refers to a loop which engages the lower hook of the part b² and straddles the loop and tare-beam B, the upper portion thereof having a hook for engagement with a loop B², attached to the equalizing-levers, as will be hereinafter set forth.

Before going into the description of the mechanism which acts in conjunction with the computing-beam it may be here stated that by disconnecting the loop B' from the double hook b² and adjusting the weight b to provide a proper poise or balance the scale may be used as an ordinary platform weighing-scale; also, that it may be used to weigh in the ordinary manner without using the computing-beam when the loop B' is in engagement with the double hook, and the beam B forms a desirable adjunct, as by moving the weight the tare can be ascertained or the scales balanced with a weight on the platform without disorganizing the computing mechanism.

C refers to a vertically-movable bar having a horizontal portion, upon which is positioned a slide C', and the vertical portions of this bar pass through apertures in the top plate of the casing A², the lower ends being spread or bifurcated and rest or bear upon knife-edges or knife-edged projections carried by levers D E, which are fulcrumed upon the fulcrum blocks attached to the cross-bars a² a'. The lever D carries a link d, which engages a pin which passes through the vertical member c of the bar C and prevents the displacement of the bar from the knife-edge bearing d'. The knife-edge bearing d² engages with a spread or recessed fulcrum-block, and between the bearings d' d² the lever D has a transverse pin d³, with which engages a link forming a connecting means with a lever F below. The lever D is spread at its end near the center portion of the scale, and these end portions have knife-edged bearings d⁴, with which engage loops and links for connecting said lever with the weight H, which is suspended from the levers D E. The lever E has a knife-edged bearing e, which engages the fixed fulcrum-block on the cross-bar a', and its end has a knife-edged bearing-pin e', with which the lower portion of the vertical member c' of the bar C engages, being held in engagement therewith by a link e². The opposite end of the lever E has a loop e³ and links for connecting the same to a cross-bar h of the weight H. The weight H is so constructed that it lies beneath the lever E and over or to one side of a lever G, but is not connected directly thereto, being suspended from the short ends of the levers D E, and this weight moves in vertical planes, its upward movement, as well as its downward movement, being limited by engagement with fixed or rigid parts of the casing.

The lever F has at one end a loop f, which engages with the hook a⁴, which projects from the supporting-frame, and intermediately has a cross-pin f', with which engages a link which depends from the pin d³ of the lever D above. The end of the lever F is bifurcated or spread and has a pin from which depends the loop B². The lever G is similarly attached to the lever E, and the end having the loop g engages the hook a³, its intermediate portion being connected by links to the lever E and its end engages the transverse pin, from which the loop B² is suspended. By the organization or arrangement of levers the weight H serves as a counterbalance and moves in opposition to the bar C and parts connected thereto.

I refers to the computing-beam, which is fulcrumed upon the standard A³ and is connected to the bar C through the slide C', connecting bars C² and block C³. The computing-beam is provided at one end with a balance-weight i, which weight is mounted on a threaded rod inclosed in a suitable casing so shaped as to prevent the turning of the weight when the supporting-rod therefor is turned, and this supporting-rod is threaded, having a screw-head at one end and a lock-nut at the other. By loosening the lock-nut the threaded rod may be turned with a screw-driver and the weight adjusted vertically, and after the adjustment is made by tightening the lock-nut further turning of the rod will be prevented. The opposite end of the computing-beam from the balance-weight passes through the upright A⁴ to limit its oscillation and is provided with a pendant adapted to receive weights having a value equivalent to five dollars or twenty dollars.

The lower bar of the computing-beam is provided on one side of its fulcrum, that nearest the pendant, with an adjustable block or weight I' and the part of the beam over which said block moves is graduated on its upper edge with a scale indicative of value in dollars up to five dollars on the upper edge and to twenty dollars on the lower edge, the weight having upper and lower pointers. Intermediate graduations may be provided on this part of the beam.

The computing-beam on the opposite side of the fulcrum from the pendant and on the same side as the balance-weight, over which the block $C^3$ passes, is graduated on the upper edge from "3" to "25" and on the lower edge from "26" to "100," and this part of the beam carries the legend "Price per pound." The block is provided with double pointers, one pointer for the upper scale and one for the lower. The upper bar of the computing-beam I is graduated from "0" to "100" on its upper edge and on its lower edge from "0" to "400" by twenties, and the beam bears the legend "Value in cents." The upper member of the computing-beam carries a block or weight $I^2$. It will be noted by an inspection of the graduations or scale on the computing-beam that those marks appertaining to value in cents or dollars are in the ratio of one to four. For instance, where on the upper part of the beam there is "100" immediately beneath the same will be "400" and on the lower part as to value in dollars where there is "5" below it will be "20." The same ratio is carried out in the price-per-pound part of the scale. For instance, where there is "25" on the upper edge of the part of the computing-beam upon which the block $C^3$ is supported immediately beneath said figure "25" will be found "100." Thus the computing-beam and its scale is graduated to operate in conjunction with the four levers D E F G, positioned within the casing $A^2$. The blocks C' and $C^3$ are provided with clutches or means for holding them in intimate engagement with the computing-beam and bar C. These clutches may be springs attached to the respective blocks or other means. The connecting-bars $C^2$ are pivotally attached to the slide or block C' and engage with knife-edged pivots carried by the upper portion of the block or weight $C^3$.

When the weight or block on the tare-beam B and the weights or blocks I' and $I^2$ on the computing-beam are placed at "0," the scale will balance or be in poise, and if not in poise when these weights or blocks are so placed the poise b or the balance-weight i should be adjusted, the latter weight being for adding weight above or below the pivot-line of the fulcrum of the computing-beam. This poise is maintained irrespective of the position of the blocks C' $C^2$, as the movement of these blocks to or from the fulcrum of the computing-lever does not affect the balance or poise of the beams when there is no weight upon the load-receiving platform.

In practice or use should a person desire to purchase, say, thirty cents' worth of merchandise the price of which is five cents a pound the merchant places the block $C^3$ at "5c" and the block $I^2$ at "30," and as soon as a sufficient quantity of merchandise has been placed on the load-receiving platform to balance the scale that amount will be indicated by the balancing. Now should the purchaser desire to ascertain how much he has received in weight the merchant moves the weight $I^2$ to "0" and then moves the weight on the tare-beam B until the tare-beam balances, which will be in this instance at six pounds.

Again should the merchant be selling something which it is necessary to place in a receptacle the weights on the computing-beam are placed at "0" and the weight on the beam B moved until said beam is balanced, then by placing the block $C^3$ on the proper mark to indicate the price per pound and the block or weight $I^2$ on the mark to indicate the value in cents the merchandise can be poured into the receptacle, and when they balance that will indicate that the proper amount has been placed in the receptacle. Thus tare can be deducted by the use of the ordinary beam B without in any wise affecting the computing-scale.

It will be observed that the beam I has on each part or section different sets of figures, and when using the figures on the lower half of the upper section of the bar the figures on the lower half of the lower bar should be used. By means of this computing-scale a merchant can supply the wants of his customers without mental calculation, provided he knows the price per pound of the article, for if a customer calls for twenty-five cents' worth of an article which is at nine cents a pound the merchant has only to move the block or poise $c^3$ to the figure "9" and the block or poise $I^2$ to the figure "25," and when the scale balances by placing the merchandise on the load-receiving platform the customer will receive the proper amount.

The pendant on the computing-beam is intended to receive a weight or weights of sufficient size to indicate or equal five or twenty dollars in value, and by adding other similar weights the capacity of the scale can be increased. When the value of the goods is beyond the capacity of the upper section of the computing-beam, the weight or poise I' is used. For instance, if a customer wanted, say, twelve dollars' worth of merchandise at fifty cents a pound the poise $C^3$ would be placed at "50" and the poise I' at "12;" but should said customer want thirty dollars' worth of merchandise the merchant will place the poise I' at "10" and add a weight to the pendant on the computing-scale which will equal twenty dollars, and then place the poise $C^3$ at the price per pound. If there is tare to be deducted, it can be done by the use of the beam B.

In a scale constructed in accordance with my invention it will be noted that I have dispensed entirely with all sliding carriages or movable parts except the poises and that all the connections and fulcrums are fixed, except as to the necessary movement of the levers, the scale is less complicated than others of the same class, and that the upper bar is for computing purposes only, while the lower bar is used for ascertaining tare or for weighing in pounds and ounces. The capacity of the scale both in computing and in weighing pounds and ounces exceeds computing-scales as at present used, and the system of equalizing-levers employed provides a scale which retains its balance irrespective of where the connecting-blocks are placed on the computing-beam.

Having thus described my invention, I do not wish to be limited to the particular construction of the parts either as described or shown, especially as to the construction of the equalizing-levers and their weight, as the shape or form of these levers may be varied, though the present form as illustrated I consider admirable for the purpose intended, as they are arranged so as to occupy but little space; and may be contained in a casing of comparatively small width and depth, which is an advantage, as the casing, being of small size, will not obstruct the light or shadow the tare-beam. It is also obvious that my invention is not limited to the use of the equalizing-levers and computing-beam with the tare-beam, as the computing-beam and its mechanism may be used independently of the tare-beam by being connected directly with the platform-supporting levers. It will also be noted that the invention is readily applicable to platform-scales as now made by simply adding the leading features of my invention to such scales.

I claim—

1. In a computing-scale, the combination of a computing-beam, a vertically-movable bar in engagement therewith, a plurality of equalizing-levers one pair thereof supporting the vertically-movable bar and another pair connected to the first-mentioned pair of levers and to a load-receiving platform.

2. In a computing or price scale, the combination of a computing-beam, a vertically-movable bar, a slide which connects the beam and bar, a plurality of equalizing-levers the free ends of one pair of said levers engaging the ends of the vertically-movable bar, a second pair of levers connected to the first-mentioned pair the free ends of said second pair being connected to each other and to a load-receiving platform.

3. In a computing or price scale, the combination of a computing-beam and a vertically-movable bar connected to the computing-beam by a slide, a plurality of equalizing-levers one pair thereof being centrally fulcrumed, the ends which project in the same direction engaging the vertically-movable bar, a second pair of levers connected to the first-mentioned pair of levers and arranged so that their free ends will be adjacent.

4. In a computing-scale, the combination of a computing-beam and a vertically-movable bar connected thereto by a slide, a plurality of equalizing-levers, a counterbalancing-weight carried by a pair of said levers the levers being organized so that the ends of the pair which carry the vertically-movable bar and the counterbalancing-weight project in the same direction, the other pair of levers being positioned beneath the first-mentioned pair and are organized so that the free ends will be adjacent, substantially as shown.

5. The combination with the computing and weighing beams of a weighing and price scale, a system of levers, a pair of said levers having fixed fulcrums, a bar supported by the ends of said levers, said bar having a horizontal portion carrying a slide, a second pair of levers the ends of which engage fixed hooks the other ends carrying a loop, a weight connected to the bar-supporting levers, a weighing or tare beam in engagement with the hook of the lower levers and means for connecting the levers which support the load-receiving platform therewith, substantially as shown.

6. In a weighing and price scale, the combination of the computing-beam, a movable weight thereon, a second movable weight or block connected to a movable weight or block beneath the same, a vertically-movable bar having a horizontal portion upon which said block is mounted, a pair of levers supported upon fixed fulcrums, the end members of the vertically-sliding bar resting upon the levers, a weight attached to the other ends of the aforesaid levers, a pair of levers suspended from the levers having the fixed fulcrums the ends of the latter levers being in engagement with loops which engage with fixed hooks, a loop attached to a pin which intersects the adjacent ends of the levers and means for connecting said levers to a weighing-beam and to a bar which connects the same with the levers of the load-receiving platform.

7. In combination with a computing-beam, a vertically-movable bar having a horizontal portion, a system of levers comprising four levers and a counterbalancing-weight arranged as shown and connected to a rod which extends therefrom to the support for the load, a receiving-platform, a tare-beam interposed between the system of levers and the said rod, substantially as shown.

8. In a weighing and price scale, the combination of the computing-beam connections between the same and a vertically-movable bar, levers upon which said bar is supported, a second set of levers suspended from the aforesaid levers, a loop or bail for engagement with the loop or bail thereof and with a double hook, a weighing-beam suitably fulcrumed and provided with a loop with which the double hook engages, a rod extending from the double hook to the load-receiving-platform-supporting levers, for the purpose set forth.

9. In a computing and weighing scale, a supporting-frame comprising a base inclosing platform-supporting levers, uprights supporting a casing, hooks projecting from the uprights, a depending support or hanger for a weighing-beam, a casing having cross-bars to which are attached fixed fulcrums the upper part of the casing having a standard upon which is fulcrumed a computing-beam and an upright through which the end of the computing-beam passes, a cover for the casing having apertures through which pass the vertical members of a vertically-movable bar, the upper casing inclosing a plurality of levers, the levers being connected together and provided with a weight also inclosed by the upper casing, substantially as set forth.

10. In a computing or price scale, the combination of a computing-beam, a vertically-movable bar connected thereto, a load-receiving platform and its supporting-levers and connecting-bars, embodying levers D and E fulcrumed intermediately upon fixed fulcrum-blocks the depending ends of the vertically-movable bar resting upon the ends of said levers D and E, a weight suspended from the ends of the levers D and E on the opposite sides of the fulcrum, levers F and G suspended near their centers from the levers D and E, the ends of said levers being in engagement with fixed hooks and with a cross-bar common to both levers with which engages a loop, said loop being connected to the supporting-levers of a load-receiving platform, for the purpose set forth.

11. In a computing or price scale the combination of a computing-beam and vertically-movable bar connected thereto, a plurality of levers organized as shown, the ends of an upper pair of the levers projecting from their fulcrums in the same direction and engaging depending members of the vertically-movable bar, a weight attached to the opposite ends of the levers, a second pair of levers suspended from the first-mentioned pair of levers said second pair of levers engaging with the frame of the scale the adjacent ends of said levers being connected and means extending from the connected ends to the supporting-levers of the load-receiving platform, with or without an interposed tare-beam.

In testimony whereof I have hereunto set my hand in presence of two subscribing witnesses.

CORNELIUS S. MORRIS.

Witnesses:
 SOL HIRSCH,
 HENRY F. VIERICH.